3,662,042
METHOD OF MAKING A NUCLEAR REACTOR FUEL ELEMENT OF URANIUM MONONITRIDE IN A REFRACTORY METAL MATRIX

Donald E. Kizer, Columbus, Ohio, Roy A. Smith, Easton, Pa., and Edward O. Speidel, Columbus, Ohio, assignors to the United States of America as represented by the United States Atomic Energy Commission
No Drawing. Filed Sept. 25, 1970, Ser. No. 75,685
Int. Cl. C01g 1/08, 43/00; G21c 21/02
U.S. Cl. 264—.5                                         7 Claims

ABSTRACT OF THE DISCLOSURE

A high-temperature dimensionally stable nuclear reactor fuel element of uranium mononitride in a refractory metal matrix having evenly distributed porosity is prepared by cold pressing a mixture of a powdered refractory metal and powdered $U_2N_3$, forming a body which is then densified by heating under pressure to prevent complete decomposition of the $U_2N_3$. The densified body is then heated to decompose the $U_2N_3$ to UN, leaving evenly distributed porosity throughout the element.

CONTRACTUAL ORIGIN OF THE INVENTION

The invention described herein was made in the course of, or under, a contract with the United States Atomic Energy Commission.

BACKGROUND OF THE INVENTION

This invention relates to a nuclear reactor fuel element. More specifically, this invention relates to a high-temperature dimensionally stable nuclear reactor fuel element. In still more detail, this invention relates to a nonswelling fuel element of uranium nitride in a refractory metal matrix having uniformly distributed porosity or void area.

One of the major problems of the atomic energy industry is the development of a fuel which can withstand the high temperatures projected for fast breeder reactors of the future. It is not possible to get the desired performance from known fuels due to dimensional instability of these fuels. Evidence is readily available which shows that at relatively low temperatures, nuclear fuels grow at a rate of about 0.5 volume percent per $10^{20}$ fissions per cm.$^3$. This growth is attributed to the appearance of two fission products in the lattice of the solid fuel for each fission event. At somewhat higher temperatures—about 1100° C. for uranium nitride—nuclear fuels begin to swell more than the above amounts. This swelling is attributed to the precipitation of the fission product gases as tiny bubbles in the fuel. These bubbles are initially formed at high pressures and they swell as a function of the temperature and the strength of the fuel. At still higher temperatures, gas mobility increases sufficiently that, after a large amount of swelling has occured, gas generation is balanced by gas release and swelling slows or ceases. Various approaches have been tried in an attempt to find a solution to the problem, including providing a plenum chamber for fission gases at one or both ends of the fuel assembly, providing porosity in the fuel, employing cladding which is strong enough to withstand the swelling, venting gases to the exterior of the assembly or changing the fuel material so that swelling does not occur. None of these solutions have been completely satisfactory for various reasons.

Of the above-enumerated approaches, that of providing porosity within the fuel has shown promise, provided that the porosity is adequate to contain the fission gases formed and is evenly distributed throughout the fuel material so the fission gases can readily escape thereinto as soon as they are formed before they can damage the fuel element by swelling.

SUMMARY OF THE INVENTION

According to the method of the present invention, fuel elements containing the desired porosity can readily be made by forming a body of a powdered mixture of a refractory metal and $U_2N_3$, densifying the body without completely decomprising the $U_2N_3$ contained therein and then decomposing the remaining $U_2N_3$, thus producing a fuel element of UN in a refractory metal matrix containing evenly distributed porosity throughout the fuel material.

It is therefore the object of this invention to make a refractory metal uranium nitride fuel which contains evenly distributed porosity throughout the fuel material.

DETAILED DESCRIPTION OF THE INVENTION

The refractory metal powder and the $U_2N_3$ powder must be intimately mixed so that the uranium nitride will be evenly distributed throughout the metal matrix. Although the powder used was −100 +200 mesh, the particle size does not appear to be critical. However, particle size will affect the matrix strength since smaller particles will result in a thinner matrix web whereas larger particles will result in a thicker and stronger matrix webbing.

The ratio of refractory metal powder to $U_2N_3$ powder is determined by the desired composition of the final fuel element and by the amount of porosity desired therein. For example, a powder mixture of 40 v/o tungsten-60 v/o $U_2N_3$ will produce a fuel element of about 40 v/o tungsten-44 v/o UN and about 10 v/o porosity and a 25 v/o tungsten-75 v/o $U_2N_3$ powder mixture will produce a fuel element of about 25 v/o tungsten-54 v/o UN and about 21 v/o porosity.

Although tungsten was used in developing the method of this invention, any refractory metal may be used which meets the strength, temperature and compatibility requirements of the particular reactor fuel application, for example, molybdenum.

The intimately mixed powders are cold-pressed into the desired green shape, using such pressure as is necessary to give the body sufficient strength to handle, for example 30 t.s.i. The addition of a binder such as paraffin may also be necessary to obtain sufficient green strength. If a binder is used to form the powders, it is necessary to degas the cold-pressed body before densification to remove the binder. It is preferred that this be accomplished by heating the body for one hour at 500° C. under a vacuum of $10^{-3}$ torr, although the body may also be degassed by heating to 1100° C. for ½ to 1 hour in a dry hydrogen atmosphere. The conditions must be such that the $U_2N_3$ present is not completely decomposed.

The green body is then densified under carefully controlled conditions so that the $U_2N_3$ will not be completely decomposed. The preferred method of densification is hot isostatic pressing, in which the body is sealed into a vacuum-tight thin metal container such as tantalum, molybdenum and subjected to a temperature of 1550 to 1600° C. at a pressure of about 10,000 p.s.i. for about 3 hours in order to densify the material to about 96 to 98% of the theoretical density. Some increase in pressure and/or temperature may be necessary to achieve these density factors with higher fuel loadings.

The refractory metal-$U_2N_3$ body can also be densified by not-pressing whereby the green body is placed in a die and subjected to a temperature of 1550 to 1600° C. at 10,000 p.s.i. for about 3 hours in a nitrogen atmosphere. The nitrogen must be under sufficient pressure to prevent the complete decomposition of the $U_2N_3$.

The amount of porosity in the final structure can be varied by controlling the percentage of $U_2N_3$ remaining in the structure after the densifying step. The $U_2N_3$ can be partially decomposed before or during densification and the amount of gas in the structure after the final heating step will depend on the amount of $U_2N_3$ remaining in the structure after densification. The only limitation is that the $U_2N_3$ not be completely decomposed during densification. Of course the lower the amount of $U_2N_3$ remaining after densification, the lower the amount of porosity of the final structure. For maximum porosity, decomposition of the $U_2N_3$ should be minimized until the final heating step.

If the hot isostatic pressing method has been used for densification, the metal container must first be removed before the decomposition step, in which the densified body is heated to a temperature of from 1500 to 2000° C. for 3 to 16 hours in a vacuum of about $5 \times 10^{-5}$ torr to decompose the $U_2N_3$. The pressure at temperature should be adjusted to be below nitrogen pressure given by the formula:

$$\text{Log } P_{N_2} = \frac{-11,850}{T(°/K.)} + 7.3226$$

and above that given by the formula:

$$\text{Log } P_{N_2} = \frac{-30,800}{T(°/K.)} + 9.08$$

where $P_{N_2}$ is the nitrogen pressure and T is the temperature. This results in a completed fuel element of uranium nitride particles uniformly dispersed throughout a refractory metal matrix and containing uniform porosity of void area through the dispersed uranium nitride particles.

The following examples are given as illustrative of the invention and are not to be taken as limiting the scope or extent of the invention.

EXAMPLE I

A powdered tungsten-60 v/o $U_2N_3$ mixture was cold-pressed into pellets at 30 t.s.i. using paraffin as a binder. The cold-pressed pellets were degassed at 1100° C. for 1 hour in dry hydrogen. The degassed pellets were sealed in tantalum cans and densified by hot isostatic pressing for 3 hours at 1600° C. and 10,000 p.s.i. The hot isostatically pressed rods were ground to remove the tantalum and were then sectioned into cylindrical rods. The rods were machined and vacuum degassed for 30 minutes at 1500° C. to remove machining fluid before being sealed in tungsten-lined tantalum cans. The encapsulated rods were then vacuum-heat-treated for 3 hours at 2000° C. to decompose the $U_2N_3$ to uranium nitride.

A study of the microstructure of the tungsten-60 v/o $U_2N_3$ before the decomposition step showed that decomposition of the $U_2N_3$ during densification was negligible. Some decomposition occurred during the vacuum degassing treatment to particles adjacent the rod surface.

The microstructure after decomposition disclosed evenly distributed void areas through the matrix which had been previously filled with $U_2N_3$. The weight loss of the tungsten-60 v/o $U_2N_3$ specimen during the decomposition step was 1.29 w/o which was in close agreement with a calculated weight loss of nitrogen of 1.26 w/o. Complete $U_2N_3$ decomposition in a structure as described should result in a tungsten-53.3 v/o uranium nitride cermet which if it was 100% of theoretical density it would have a density of 16.66 gm. per cm.$^3$. The density obtained was 14.60 gm. per cm.$^3$.

EXAMPLE II

Powder blends of tungsten-60 v/o $U_2N_3$ and tungsten-75 v/o $U_2N_3$ were cold-pressed into pellets at 30 t.s.i. and the cold-pressed pellets were vacuum degassed at 500° C. for 30 minutes. The pellets were sealed into tantalum cans by electron beam welding and densified by hot isostatic pressing for 3 hours at 1550° C. and 10,000 p.s.i.

Metallographic examination of the materials showed fabrication had been accomplished without decomposition of the $U_2N_3$. The matrix appeared to have sufficient porosity for the removal of nitrogen during the post-densification heat treatment for $U_2N_3$ decomposition. The rods were declad by surface grinding and were sectioned into pellets about 0.25 inch long before heat-treating for 8 hours at 1550° C. to decompose the $U_2N_3$ to uranium nitride, which resulted in pellets of tungsten containing 44 and 54 v/o uranium nitride.

Thermal tests were conducted by sealing the pellets in tungsten cans by electron beam welding and heating the sealed pellets in a vacuum furnace at various temperatures for various periods of time. Table I shows the data for the various uranium nitride-tungsten cermets which were prepared for the thermal stability tests, showing the composition of the hot-pressed material before and after decomposition of the $U_2N_3$.

TABLE I

| | As isostatically hot-pressed material | | | | Isostatically hot-pressed material after decomposition heat treatment | | | |
|---|---|---|---|---|---|---|---|---|
| | Composition, v/o | | Density, percent of theoretical | | Composition, v/o | | Density, percent of theoretical | |
| Specimen | $U_2N_3$ | Tungsten | Dry [a] | Wet [b] | UN | Tungsten | Dry [a] | Wet [b] |
| UN60-3D | 60 | 40 | 90 | 92 | 44 | 40 | 77 | 93 |
| UN60-3A | 60 | 40 | 91 | 93 | 44 | 40 | 78 | 94 |
| UN60-3B | 60 | 40 | 91 | 92 | 44 | 40 | 77 | 94 |
| UN60-3G | 60 | 40 | 90 | 92 | 44 | 40 | 77 | 93 |
| UN75-1D | 75 | 25 | 87 | 91 | 54 | 25 | 74 | 96 |
| UN75-1A | 75 | 25 | 89 | 93 | 54 | 25 | 74 | 95 |
| UN75-1B | 75 | 25 | 89 | 92 | 54 | 25 | 74 | 93 |
| UN75-1C | 75 | 25 | 89 | 92 | 54 | 25 | 75 | 95 |
| UN75-1H | 75 | 25 | 89 | 93 | 54 | 25 | 74 | 96 |

[a] Dry densities were obtained from specimen dimensions and dry weights.
[b] $CCl_4$ was used as the liquid medium in all wet density determinations. Specimens were immersed in $CCl_4$ and evacuated for approximately 5 minutes before wet weights were determined.

In Table II are the results of some of the thermal stability tests on the tungsten-44 v/o uranium nitride and tungsten-54 v/o uranium nitride cermets, showing the effect of the heat upon the density of the pellets of varying composition.

TABLE II

| Cermet Composition | Specimen | Density before heat treatment, percent of theoretical | | Scheduled thermal stability heat treatment a | | Density change during heat treatment, percent | | Status of specimen heat treatment |
| --- | --- | --- | --- | --- | --- | --- | --- | --- |
| | | Dry | Wet | Temp., °C. | Time, hr. | Dry density | Wet density | |
| Tungsten, 44 v/o UN | UN60-3D | 77 | 93 | 1,600 | 100 | −2.8 | −3.00 | Test completed. |
| | UN60-3E | 78 | 94 | 1,600 | 300 | | | 100 hrs. completed. |
| | UN60-3F | 78 | 94 | 1,600 | 500 | | | Do. |
| | UN60-3A | 78 | 94 | 1,800 | 100 | −3.0 | −5.3 | Test completed. |
| | UN60-3B | 77 | 94 | 1,800 | 300 | −1.7 | −6.4 | Do. |
| | UN60-3C | 77 | 93 | 1,800 | 500 | | | 300 hrs. completed. |
| | UN60-3G | 77 | 93 | 2,000 | 100 | −0.8 | −13.9 | Test completed. |
| | UN60-3H | 78 | 93 | 2,000 | 300 | | | 100 hrs. completed. |
| | UN60-3I | 78 | 93 | 2,000 | 500 | | | Do. |
| Tungsten, 54 v/o UN | UN75-1D | 74 | 96 | 1,600 | 100 | +2.9 | −0.9 | Test completed. |
| | UN75-1E | 74 | 95 | 1,600 | 300 | | | 100 hrs. completed. |
| | UN75-1G | 74 | 95 | 1,600 | 500 | | | Do. |
| | UN75-1A | 74 | 95 | 1,800 | 100 | +3.9 | | Test completed. |
| | UN-1B | 74 | 93 | 1,800 | 300 | +4.3 | −3.6 | Do. |
| | UN75-1C | 75 | 95 | 1,800 | 500 | | | 300 hrs. completed. |
| | UN75-1H | 74 | 96 | 2,000 | 100 | +9.3 | −3.3 | Test completed. |
| | UN75-1I | 74 | 93 | 2,000 | 500 | | | 100 hrs. completed. | a All specimens heat-treated at the same temperature were heat-treated in the same furnance run.

The data in Table II indicate that the tungsten-44 and 54 v/o uranium nitride cermets behaved differently Cermets containing 44 v/o uranium nitride showed growth after each heat treatment. In addition to the slight growth, the decreases in wet density after 100 hours at 1800° C., 300 hours at 1800° C. and 100 hours at 2000° C. indicate a definite reduction in the amount of open porosity. The specimen heated for 100 hours at 1600° C. shows comparable decreases in dry and wet porosities after the heat treatment, indicating a volume increase rather than a change in the amount of open porosity. The cermets containing 54 v/o uranium nitride showed shrinkage after each test which increased with time and temperature, indicating sintering.

It can be seen from the above test that the method of this invention produces refractory metal-uranium mononitride fuel elements containing evenly distributed porosity which are dimensionally stable at high temperatures.

It will be understood that the invention is not to be limited to the details given herein but that it may be modified within the scope of the appended claims.

The embodiments of the invention in which an exclusive property or privilege is claimed are defined as follows:

1. A method of making a refractory metal-uranium mononitride nuclear reactor fuel element containing evenly distributed porosity, comprising: mixing a powdered refractory metal and powdered $U_2N_3$ together, pressing said mixed powders to form a green body, densifying said body without completely decomposing said $U_2N_3$ contained therein by heating said body under pressure and decomposing the remaining $U_2N_3$ to UN by heating said densified body in a vacuum, thereby forming a refractory metal-uranium nitride fuel element containing evenly distributed porosity.

2. The method of claim 1 wherein the powdered refractory metal is selected from a group consisting of molybdenum and tungsten.

3. The method of claim 2 wherein the body is densified by hot isostatic pressing.

4. The method of claim 3 comprising the additional step of sealing the body in a vacuum-tight metal can and heating the sealed body to 1550 to 1600° C. under a pressure of 10,000 p.s.i. for about three hours.

5. The method of claim 2 wherein the body is densified by heating in a nitrogen atmosphere at a temperature of 1550 to 1600° C. at a pressure of 10,000 p.s.i. for three hours.

6. The method of claim 1 wherein said body is decomposed by sealing said body in a tungsten-lined tantalum container and heating said body to a temperature of 1500 to 2000° C. under a vacuum of $5 \times 10^{-5}$ torr for 8 to 16 hours.

7. A method of making a tungsten-uranium mononitride nuclear reactor fuel element containing evenly distributed porosity, comprising: mixing powdered tungsten metal and powdered $U_2N_3$ together with a paraffin binder, cold-pressing said powders to form a green body, degassing said body at 1100° C. for one hour in dry hydrogen, thereby removing said binder, sealing said body in a vacuum-tight tantalum container densifying said sealed body by hot isostatic pressing at 1600° C. and 10,000 p.s.i. for about three hours, removing the tantalum container from said densified body, sealing said body in a tungsten-lined tantalum can, decomposing said sealed densified body by heating said body to 1500 to 2000° C. at $5 \times 10^{-5}$ torr for 8 to 10 hours, thereby decomposing the $U_2N_3$ contained therein to uranium mononitride, thereby forming a tungsten-uranium nitride fuel element containing evenly distributed porosity throughout the element.

References Cited
UNITED STATES PATENTS

| | | | |
| --- | --- | --- | --- |
| 3,327,027 | 6/1967 | St. Pierre | 264—.5 |
| 3,417,167 | 12/1968 | Kizer | 23—347 |
| 3,042,594 | 7/1962 | Hauth | 264—.5 |
| 3,345,436 | 10/1967 | Craig | 264—.5 |
| 3,173,753 | 3/1965 | Accary et al. | 264—.5 |
| 3,536,793 | 10/1970 | Norman | 264—.5 |
| 3,180,702 | 4/1965 | Lapat | 23—347 |
| 3,348,943 | 10/1967 | Pollock | 264—.5 |
| 3,331,682 | 7/1967 | Pritchard | 264—.5 |
| 3,349,152 | 10/1967 | Watanake et al. | 264—.5 |

BENJAMIN R. PADGETT, Primary Examiner

R. S. GAITHER, Assistant Examiner

U.S. Cl. X.R.

23—347; 176—89